Dec. 13, 1932.  F. B. STOVER  1,891,119
SAFETY VALVE
Filed July 13, 1931
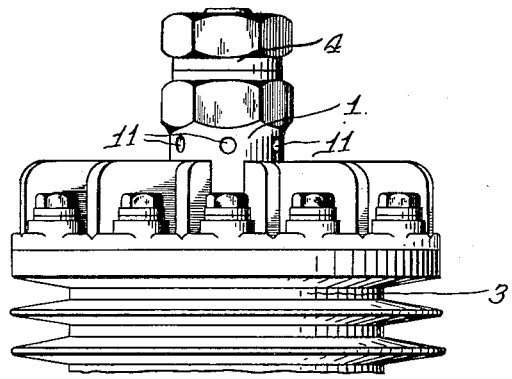
Fig. 1.
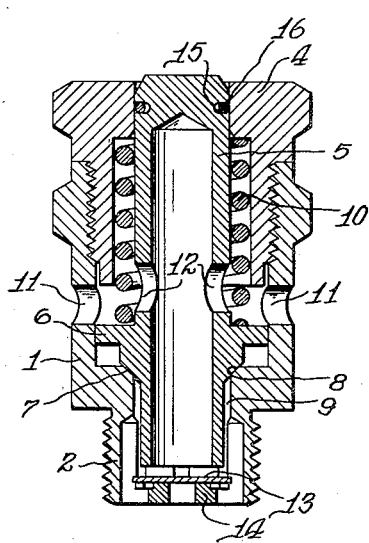
Fig. 2.
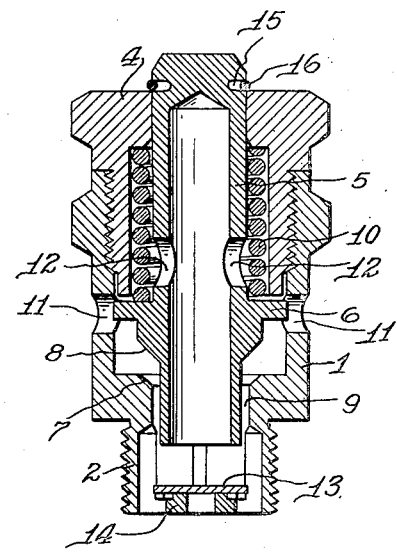
Fig. 3.
INVENTOR
Frank B. Stover
BY 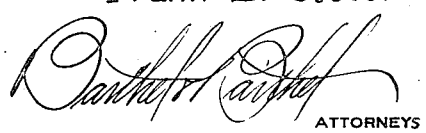
ATTORNEYS Patented Dec. 13, 1932

1,891,119

UNITED STATES PATENT OFFICE

FRANK B. STOVER, OF DETROIT, MICHIGAN, ASSIGNOR TO SKY SPECIALTIES CORPORATION, OF DETROIT, MICHIGAN, A CORPORATION OF MICHIGAN

SAFETY VALVE

Application filed July 13, 1931. Serial No. 550,503.

The present invention pertains to a novel safety valve designed to relieve a vessel, such as the cylinder of a compressor when an excessive pressure accumulates therein.

In addition to the object already indicated, in the accomplishment of which the valve opens the vessel to the atmosphere under excessive pressure in the former, the invention further provides a valve of this character which is positively held open after being initially moved to its relief or exhausting position. This condition of the valve, as distinguished from the intermittent opening and closing of a conventional safety valve, results in idle operation of the pressure apparatus and thus calls attention to the fact that there is a defect in the system. The detent which holds the valve in exhausting position may readily be returned to a position permitting the closing and normal functioning of the valve, after the defect has been discovered and remedied.

The invention is adapted for use particularly in connection with air compressors, especially for pneumatic starters on aircraft. In the event that one of the lines in the pressure fluid system becomes clogged, continued operation of the compressor would develop pressure in the cylinder head or communicating parts until the weakest part breaks. The safety valve obviously prevents such a condition and further serves as an indicator of defects in the manner already mentioned. The idle operation of the compressor while the valve is held open is of comparatively little consequence in an aircraft installation inasmuch as the air pressure is used only on starting.

The invention is fully disclosed by way of example in the following description and in the accompanying drawing, in which—

Figure 1 is an elevation showing the safety valve applied to a cylinder;

Fig. 2 is a longitudinal section of the valve in its normal position; and

Fig. 3 is a similar section of the valve in relief position.

Reference to these views will now be made by use of like characters which are employed to designate corresponding parts throughout.

The device comprises a generally cylindrical body portion 1 having a reduced threaded end 2 adapted to be threaded into a vessel such as a cylinder 3 for fluid communication therewith. The body is completed by means of a cap 4 threaded into the opposite end thereof.

A sleeve 5 is slidably mounted in the body and passes through the cap 4 as clearly shown in Figures 2 and 3. The sleeve is spaced annularly from the inner wall of the body and is centered by a flange 6 engaging said inner wall. Near the outlet end 2 of the valve body, the inner wall of the body is formed with a valve seat 7. The sleeve is formed with a valve face 8 adapted to close upon the valve seat. It is also to be noted that the body is spaced from the sleeve as at 9, between the valve seat 7 and the outlet portion 2.

The valve face 8 is normally held closed against the valve seat 7 by a spring 10 surrounding the sleeve and bearing against the cap 4 and flange 6. The body 1 and sleeve 5 are formed with ports 11 and 12 respectively which place the interior of the sleeve in communication with the atmosphere. It will be seen that in the normal operative position of the device as shown in Figure 2, the valve parts 7 and 8 obstruct communication between the ports 11 and space 9.

Beneath the lower or outlet end of the sleeve 5, a valve disk 13 is mounted and guided in a floating manner within the outlet end 2 and is adapted to rest on stops 14 provided in this end. When resting on the stops 14, the disk 13 is spaced from the lower end of the sleeve 5 as shown in Figure 2.

In the operation of the device, assuming that the member 3 is the cylinder of a compressor, the suction stroke of the piston therein draws the disk 13 to the stops 14 and permits air to be drawn from the atmosphere through the ports 11 and 12 and sleeve 5 into the cylinder. On the pressure stroke of the piston, the disk is thrown against the open end of the sleeve 5 to close the same, whereupon the air or gas compressed within the cylinder is discharged through the normal cylinder outlet. In the event that the pressure within the cylinder or communicating fluid system exceeds the pressure of the spring 10 for any reason, such pressure on the disk and the lower, uncovered area of the valve face 8 will lift the sleeve against the action of the spring, thereby spacing the valve face 8 from the seat 7. The fluid pressure is immediately effective on a larger area, namely that of the entire valve face 8 and flange 6, whereupon the sleeve 5 is raised to the position shown in Figure 3, placing the space 9 in communication with the atmosphere through the ports 11. The pressure of the spring obviously determines the fluid pressure at which this action occurs, and the spring may be adjusted by turning the cap 4 in the body 1.

The upper end of the sleeve 5 has a peripheral groove 15 normally disposed within the cap and containing a split spring ring 16 held in a compressed condition. When the sleeve is raised by excessive pressure in the fluid system, the spring 16 expands over the top of the cap and positively holds the valve in open or relief position, so that fluttering of the sleeve is avoided. Inasmuch as the lifting of the sleeve 5 is due to a defect in the fluid system, such as the clogging of a pipe, it is preferred that the sleeve remain in its raised position until the apparatus received attention, and the spring 16 accomplishes this function in the manner already described. In other words, the idle operation of the compressor following the detention of the sleeve in raised position calls attention to the apparatus and is an indication of a defect in the system. After the defect has been discovered and repaired, the ring 16 is contracted, for example by means of a pair of pliers, so that it may be reinserted in the body of the device.

Although a specific embodiment of the invention has been illustrated and described it will be understood that various alterations in the details of construction may be made without departing from the scope of the invention, as indicated by the appended claims.

What I claim is:—

1. A safety valve comprising a body having an outlet portion adapted for fluid communication with a pressure vessel, a sleeve slidably mounted in said body, a valve seat formed in said body and a cooperating valve face formed on said sleeve, said body and valve being spaced apart between said seat and said outlet portion, a spring between said body and sleeve and tending to hold said face in closed position on said seat, said body having ports in communication with the atmosphere, a floating disk mounted in said outlet portion and adapted to close the adjacent end of said sleeve under pressure in the vessel, and a spring detent carried by said sleeve and normally inoperatively held within said body, said detent being adapted to expand over said body when said sleeve is extruded from said body by a pressure on said disk exceeding the pressure of said spring, whereby to hold said valve face spaced from said valve seat.

2. A safety valve comprising a body having an outlet portion adapted for fluid communication with a pressure vessel, a sleeve slidably mounted in said body, a valve seat formed in said body and a cooperating valve face formed on said sleeve, said body and valve being spaced apart between said seat and said outlet portion, a spring between said body and sleeve and tending to hold said face in closed position on said seat, said body and sleeve having ports adapted to place the interior of said sleeve in communication with the atmosphere when said face is on said seat, a floating disk mounted in said outlet portion and adapted to close the adjacent end of said sleeve under pressure in the vessel, and a spring detent carried by said sleeve and normally inoperatively held within said body, said detent being adapted to expand over said body when said sleeve is extruded from said body by a pressure on said disk exceeding the pressure of said spring, whereby to hold said valve face spaced from said valve seat.

3. A safety valve comprising a body having an outlet portion adapted for fluid communication with a pressure vessel, a sleeve slidably mounted in said body, a valve seat formed in said body and a cooperating valve face formed on said sleeve, said body and valve being spaced apart between said seat and said outlet portion, a spring between said body and sleeve and tending to hold said face in closed position on said seat, said body comprising two parts one threaded to the other and engaged by said spring, whereby said spring may be adjusted, said body and sleeve having ports adapted to place the interior of said sleeve in communication with the atmosphere when said face is on said seat, a floating disk mounted in said outlet portion and adapted to close the adjacent end of said sleeve under pressure in the vessel, and a spring detent carried by said sleeve and normally inoperatively held within said body, said detent being adapted to expand over said body when said sleeve is extruded from said body by a pressure on said disk exceeding the pressure of said spring, whereby to hold said valve face spaced from said valve seat.

4. In a safety valve, a body having an outlet portion adapted for communication with a pressure vessel, a slidable member in said body and adapted in different positions to obstruct said portion from the atmosphere and connect said portion to the atmosphere, pressure operated means in said portion for actuating said member, and a spring detent carried by said member and normally inoperatively held within said body and adapted to expand over said body when said member is extruded from said body by operation of said means.

5. In a safety valve, a body having an outlet portion adapted for communication with a pressure vessel, a slidable member in said body and adapted in different positions to obstruct said portion from the atmosphere and connect said portion to the atmosphere, pressure operated means in said portion for actuating said member, a spring detent carried by said member and normally inoperatively held within said body and adapted to expand over said body when said member is extruded from said body by operation of said means, and a spring between said body and member and tending to hold said member in the position obstructing communication between said portion and the atmosphere, in opposition to said pressure operated means.

In testimony whereof I affix my signature.

FRANK B. STOVER.